United States Patent [19]

Goss

[11] Patent Number: 4,571,649

[45] Date of Patent: Feb. 18, 1986

[54] DISK DRIVE CARRIAGE STRUCTURE

[75] Inventor: Lloyd C. Goss, Bloomington, Minn.

[73] Assignee: Magnetic Peripherals, Inc., Minneapolis, Minn.

[21] Appl. No.: 409,386

[22] Filed: Aug. 18, 1982

[51] Int. Cl.³ .............. G11B 5/55; G11B 21/08; G11B 5/012; G11B 5/016
[52] U.S. Cl. .................. 360/106; 360/98; 360/99; 360/107; 310/13
[58] Field of Search ............ 360/97, 104, 128, 105, 360/109, 98, 86; 310/15, 27, 13; 369/219, 221, 244, 247, 255, 256

[56] References Cited

U.S. PATENT DOCUMENTS

| 850,036 | 4/1907 | Morin | 360/86 |
|---|---|---|---|
| 3,417,268 | 12/1968 | Lace | 310/27 |
| 3,439,198 | 4/1969 | Lee | 310/13 |
| 3,487,241 | 12/1969 | Carter | 310/13 |
| 3,521,092 | 7/1970 | Kalthoff | 310/27 |
| 3,536,942 | 10/1970 | Zamparo | 310/27 |
| 3,586,891 | 6/1971 | Applequist | 310/27 |
| 3,614,333 | 10/1971 | Iwata | 179/100.2 CA |
| 3,643,242 | 2/1972 | Bryer | 360/98 |
| 3,665,433 | 5/1972 | Gillum et al. | 340/174.1 F |
| 3,666,977 | 5/1972 | Helms et al. | 310/13 |
| 3,740,736 | 6/1973 | Dion et al. | 360/86 |
| 3,743,794 | 7/1975 | Miller, III | 179/100.2 CA |
| 3,760,206 | 1/1973 | Hertrich | 310/13 |
| 3,886,595 | 5/1975 | Swaim et al. | 360/98 |
| 3,938,192 | 2/1976 | Caletti | 360/97 |
| 4,001,889 | 1/1977 | Schneider | 361/104 |
| 4,034,411 | 7/1977 | Kraemer et al. | 360/98 |
| 4,107,748 | 8/1978 | Ito | 360/104 |
| 4,144,466 | 3/1979 | Hatch | 310/13 |
| 4,331,990 | 5/1982 | Frandsen | 360/97 |
| 4,393,425 | 7/1983 | Wright | 360/105 |
| 4,429,336 | 1/1984 | Berube et al. | 360/97 |
| 4,441,130 | 4/1984 | Boehm et al. | 360/97 |

Primary Examiner—Stuart N. Hecker
Assistant Examiner—Alfonso Garcia
Attorney, Agent, or Firm—Edward L. Schwarz; Joseph A. Genovese

[57] ABSTRACT

A disk memory assembly has a carriage structure which has a coil assembly secured to one end and is supported by bearings for rectilinear movement in response to the energization of a voice coil. The carriage has four fins, a tower member and a horizontal shoe member. The tower supports a plurality or arms carrying heads. The heads read or write upon disks rotated by a spindle about a spindle axis. A servo system is provided to energize the coil to position the heads at the desired locations on the disks. Rectilinear movement of the carriage in response to the servo excites resonances in the carriage. The carriage structure is designed to minimize low frequency resonance modes and to increase the frequency of the first major resonance mode of the carriage to improve servo control. The four fins of the carriage are orthogonally disposed with respect to one another and disposed at 45° angles with respect to the spindle axis. The fins are joined along their inner edges to form a central beam and extend from the coil to the tower and shoe members of the carriage. The lower pair of fins extends along the bottom of the shoe to provide rigidity in the shoe. The carriage structure minimizes low frequency bending modes and remains substantially entirely in tension and compression at higher frequencies to increase the frequency of the first major resonance mode.

8 Claims, 5 Drawing Figures

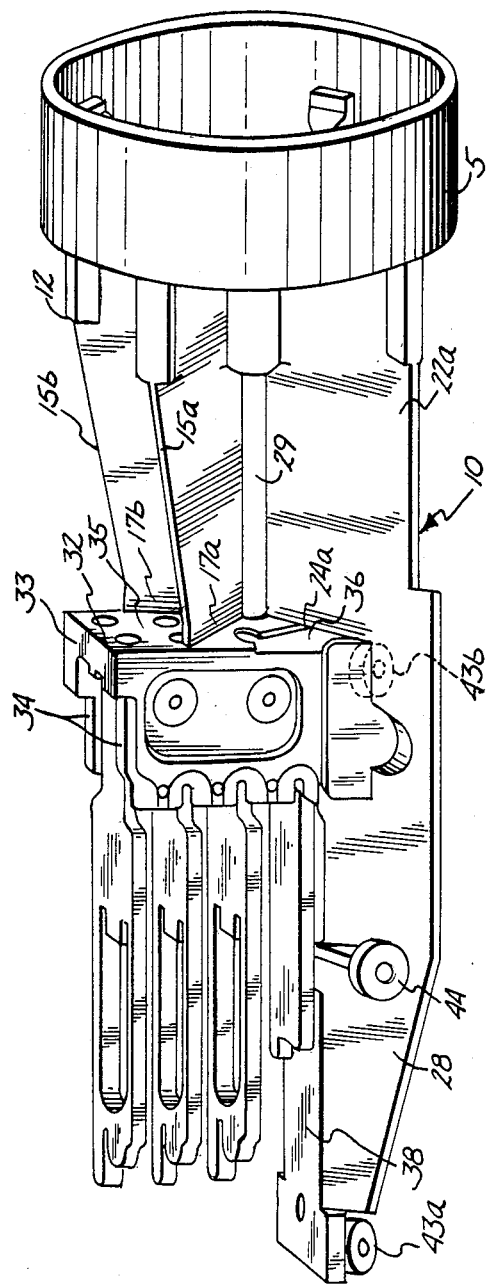
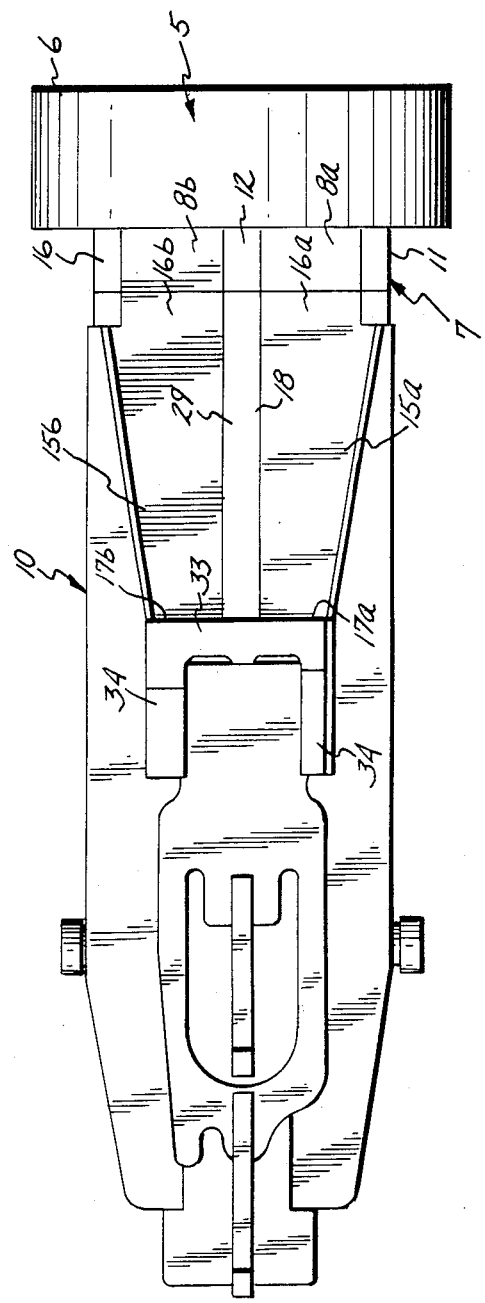
Fig.2
Fig.4

DISK DRIVE CARRIAGE STRUCTURE

BACKGROUND OF THE INVENTION

The present invention relates to rotating disk memory assemblies, and more particularly, to carriage structures employed therein.

Rotating disk memories comprise one or more disks driven about a vertical spindle axis. Each disk typically has a plurality of concentric tracks on one or both surfaces from which information is read or onto which information is written by means of reading and/or writing heads. One of the disks generally carries a dedicated servo track which contains head position information and which is read by a dedicated servo head. The servo head provides the input to a servo system which positions the heads over the surface of the disks, generally moving the heads radially with respect to the disks. The heads are carried on arms which are coupled to the voice coil actuator by the carriage. The coil is selectively energized by the servo system to move radially with respect to the disks. The movement of the coil is transferred to the heads through the carriage structure. During track accessing or following, the carriage moves rectilinearly and this rectilinear movement excites resonances in the carriage. When the carriage is excited into a major resonance mode servo control deteriorates. In order to increase the operable frequency band width of the servo, it is therefore necessary to minimize the low frequency resonance modes and thereby increase the frequency of the first major resonance mode.

There has, therefore, been a need for a carriage structure which minimizes low frequency resonance modes and increases the "natural frequency" of the carriage.

One attempt to improve carriage resonance characteristics is shown in U.S. Pat. No. 4,144,466 wherein an elastomeric material is provided between the coil and carriage to dampen vibrations.

Other prior art structures are shown in U.S. Pat. Nos. 4,034,411; 4,001,889; 3,760,206; 3,743,794; 3,740,736; 3,666,977; 3,665,433; 3,614,333; and 850,036.

None of these references show a carriage structure which sufficiently avoids the low frequency resonance problems associated with previous carriages as outlined above.

SUMMARY OF THE INVENTION

The present invention overcomes the low frequency resonance problems of the prior art by providing a carriage structure which takes the carriage members out of low frequency bending modes and places them substantially entirely in tension and compression. By maintaining the carriage in tension and compression at higher frequencies the natural frequency of the carriage is increased. To achieve this object, an "X design" structure is disclosed which employs four fins joined along their inner edges at a central beam. The fins are secured at their rearward ends to the coil assembly and at their forward ends to the tower and shoe members of the carriage. The fins are orthogonally disposed with respect to one another and assume a 45° angular orientation with respect to the disk spindle axis. When viewed through the coil from the rear, the fins resemble an "X," and hence, the carriage is said to have an "X design." The "X design" provides for good bearing placement and support shaft clearance while permitting compactness in design.

It is therefore an object of the present invention to provide an improved carriage structure.

It is a further object to provide a carriage structure which minimizes low frequency resonance patterns and increases the frequency of the first major resonance mode of the carriage.

Yet another object is to increase the natural frequency of the carriage by providing a carriage design in which the carriage members are maintained substantially entirely in tension and compression.

Still another object is to provide a four fin carriage structure in which the fins are acutely disposed with respect to the spindle axis.

A still further object is to provide a four fin carriage structure wherein the fins are orthogonally disposed with respect to one another and oriented at 45° angles with respect to the spindle axis.

A still further object is to provide a carriage design wherein one or more of the carriage fins is employed to stiffen the shoe of the head/arm support structure, and to comprise a continuous beam extending along the entire carriage.

Still another object is to provide an improved carriage structure which provides for good bearing placement and support shaft clearance while permitting compactness in design.

These and other objects, advantages and novel features of the present invention will become apparent from the following detailed description of the invention taken in conjunction with the accompanying figures.

BRIEF DESCRIPTION OF THE FIGURES

FIG. 2 is a perspective view of the present invention.

FIG. 4 is a plan view of the present invention.

DESCRIPTION OF THE PREFERRED EMBODIMENT

Figure 1:
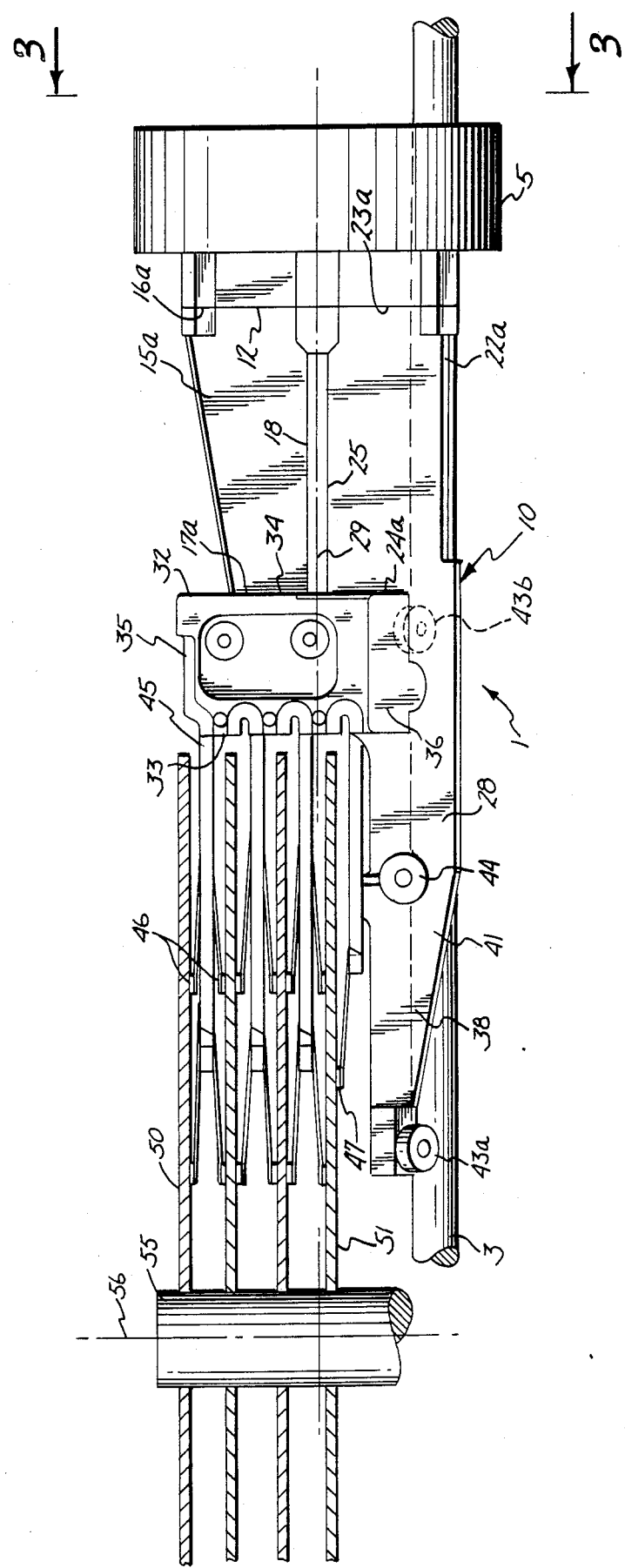
FIG. 1 is an elevational view of the carriage of the presently preferred embodiment of the invention operably positioned with respect to the memory disks.

In brief overview, with reference to FIGS. 1-5, the disk assembly 1 includes a voice coil assembly 5 which is secured to the rear end of carriage structure 10. The carriage 10 is comprised of fins 15a, 15b, 22a, 22b, tower 32, and shoe 38. A plurality of arms 45 are supported by tower 32. The arms 45 support heads 46, 47. A stack of disks 50, 51 are rotatably driven by a spindle 55. Bearings 43a, 43b, and 44 support the carriage 10 for rectilinear movement on shaft 3 and horizontal supporting surfaces not shown.

Figure 3:
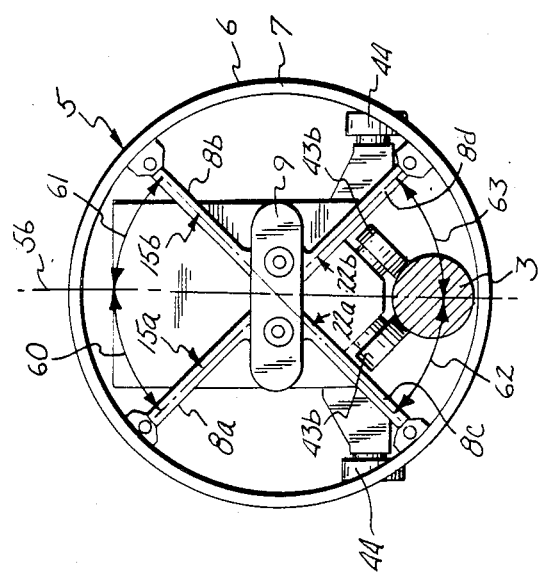
FIG. 3 is an elevational view of the present invention taken along line 3—3 of FIG. 1.

Voice coil assembly 5, best shown in FIGS. 1 and 3, has a ring shaped voice coil 6. Legs 8a–8d extend from the interior circumference of coil 6 to a hub 9. The assembly 5 is bolted to the rear end of carriage 10 as shown in FIG. 3.

The carriage structure 10 has four fins 15a, 15b, 22a, 22b, a tower member 32 and a shoe member 38. The carriage 10 is a single piece casting. With reference to FIG. 3, the upper pair of fins 15a, 15b are disposed at 45° angles 60, 61 from the axis 56 of disk spindle 55. Likewise, the lower pair of fins 22a, 22b are disposed at 45° angles 62, 63 from axis 56. While, in the presently preferred embodiment, the fins 15a, 15b, 22a and 22b are disposed at 45° angles with respect to axis 56 and are generally orthogonal with respect to one another, the invention is not intended to be limited to a 45° disposition of the fins. Rather, it is to be understood that within the teachings of the invention the angle of disposition could be other acute angles less than 90°. The rearward ends 16a,b of fins 15a,b are bolted to legs 8a, 8b, respectively, of the coil assembly 5. See FIG. 4. Likewise, the rearward end 23a of lower fin 22a is bolted to leg 8c of coil assembly 5. The rearward end of lower fin 22b is similarly bolted to leg 8d of coil assembly 5. Each of the legs 8a, b, c, d may have a thickened section 11 as shown on leg 8a. Fins 15a, 15b, 22a and 22b are joined along their inner edges 18, 25, respectively to form a central beam 29. Hub 9 of the coil assembly 5 is bolted to the beam 29 at ref. no. 12, FIG. 4. The legs 8a–8d and hub 9, thus, form a rearward extension of the four fin portion of carriage 10. The entire coil assembly 5 is easily removeable as necessary for repair, replacement or inspection.

Upper fins 15a,b extend forwardly from their rearward ends 16a,b to their forward ends 17a,b where they are joined to the rear side of the upper portion 35 of tower 32. See FIGS. 2 and 4. Lower fin 22a extends from its rearward end 23a forwardly to its forward end 24a where it is joined to the rear side of the lower portion 36 of tower 32. The second similar lower fin 22b angularly positioned with respect to lower fin 22a as shown in FIG. 3, extends similarly from its rearward end to join to the rear side of the lower portion 36 of tower 32. Tower 32 has a crossbeam 33 and sidebeams 34. See FIGS. 2 and 4. The upper fins 15a, 15b are joined directly to side beams 34 to improve carriage rigidity. Lower fins 22a, 22b include integral extended portions 28 which extend along the bottom 41 of shoe 38 to just behind the forward bearings 43. Lower fins 22a,b, thus, form a stiffening structure along the center of the carriage to eliminate low frequency bending modes. The lower fins 22a,b comprise a pair of continuous beams extending along a substantial portion of the length of carriage 10 to improve carriage rigidity.

Figure 5:
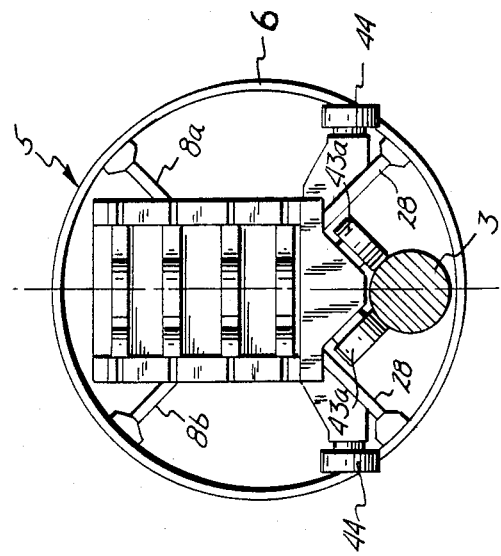
FIG. 5 is an elevational view of the invention taken along line 5—5 of FIG. 4.

The carriage 10 is supported by forward bearings 43a, rear bearings 43b and side bearings 44. Forward bearings 43a and rear bearings 43b ride upon support shaft 3 as can best be appreciated by reference to FIGS. 1, 3 and 5. Both the forward bearing pair 43a, and rear bearing pair 43b are inclined inwardly to ride upon the shaft 3. Side bearings 44 ride upon horizontal support surfaces not shown. As shown in FIGS. 3 and 5, the four fin design of the instant carriage provides for free passage of shaft 3 between the lower fins 22a, 22b as the carriage 10 moves with respect to shaft 3. The design also permits the bearings 42a, 42b, 43 to be relatively well spread out to restrain carriage pitch while permitting the carriage 10 to be relatively compact in overall size. The design, moreover, places the bearings close to the longitudinal axis of the center of gravity of the carriage which reduces the overall height of the carriage and further tends to eliminate bending modes, enabling the carriage 10 to remain in tension and compression at higher frequencies. By encouraging compactness in design, the instant structure reduces power requirements and provides a combination of light carriage weight with good carriage rigidity.

It should now be appreciated that the instant structure increases the natural frequency of the carriage and thereby improves servo control by eliminating low frequency bending modes and maintaining the carriage substantially entirely in tension and compression at higher frequencies.

It is noted that in addition to improving longitudinal rigidity, the instant carriage design provides good structural stiffness across the coil assembly 5 by providing, in effect, two straight beams (8a, 8d and 8b, 8c) across the coil assembly 5. These beams operate in tension and compression to constrain eliptical resonance modes in the coil 5.

Having hereby disclosed the presently preferred embodiment of the invention, it is intended to be understood that various modifications and variations could be made by those skilled in the art, and that the invention is, therefore, intended to be limited only by the scope of the appended claims.

What is claimed is:

1. In a disk memory assembly having at least one disk mounted for rotation on a spindle, a coil assembly, and a plurality of heads supported by a plurality of arms, wherein each of said heads is positioned operationally proximate a disk, said spindle having an axis of rotation, the improvement comprising:

a carriage structure having a tower extending parallel to the spindle axis and comprising two sidebeams and a crossbeam connecting the sidebeams and having bearings for supporting said carriage structure for rectilinear movement on a supporting shaft under the influence of said coil assembly, said arms being supported by said tower side facing the disk spindle, said carriage structure including two upper and two lower rigid, planar fins, each fin having inner and outer edges and forward and rearward ends, each of said upper fins being at its forward end joined to the tower with an end of its outer edge adjacent one crossbeam and each of said lower fins being at its forward end joined to the tower, each fin at its rearward end secured to said coil assembly, and all of said fins being joined along their inner edges to form a central beam, each of said fins forming an acute angle with respect to the spindle axis, whereby the carriage rigidity is improved.

2. The disk memory assembly of claim 1, wherein each of said fins, cross sections are orthogonally disposed with respect to one another.

3. The disk memory assembly of claim 2, wherein each of said fins, cross section is disposed at a 45° angle with respect to said spindle axis of said disks.

4. The disk memory assembly of claim 1 wherein said carriage includes a shoe member having a rearward end and a forward end, said tower having an upper and a lower portion and a front side facing the disk spindle and a rear side facing the coil assembly and being joined at said lower portion to said rearward end of said shoe, said shoe extending from said front side of said tower in the same direction as said arms to underly said arms, said lower fins being joined at said forward ends to said lower portion of said rear side of said tower and integrally to said shoe.

5. The disk memory assembly of claim 4, wherein said shoe has a bottom portion and said lower fins are joined along said bottom portion of said shoe to comprise a pair of continuous beams running along a substantial portion of the length of said carriage.

6. The disk memory assembly of claim 1 wherein said lower fins provide for unobstructed passage of said supporting shaft between said lower fins as said carriage moves rectilinearly with respect to said supporting shaft.

7. The disk memory assembly of claim 1 wherein said coil assembly includes a coil secured to the exterior circumference of a ring member, and further includes four leg members extending from the interior circumference of said ring member to a hub member, said coil assembly being removeably secured to the rearward end of said fins.

8. The disk memory assembly of claim 7 wherein said legs of said coil assembly comprise a rearward extension of said fins.

* * * * *